UNITED STATES PATENT OFFICE.

MAX ENGELMANN AND BENEDICT MERKEL, OF ELBERFELD, GERMANY, ASSIGNORS TO FARBENFABRIKEN VORM. FRIEDR. BAYER & CO., OF ELBERFELD, GERMANY, A CORPORATION OF GERMANY.

ALKYL ETHER OF ISOUREA.

1,028,936.   Specification of Letters Patent.   Patented June 11, 1912.

No Drawing.   Application filed August 9, 1911. Serial No. 643,197.

*To all whom it may concern:*

Be it known that we, MAX ENGELMANN and BENEDICT MERKEL, doctors of philosophy, chemists, citizens of the German Empire, residing at Elberfeld, Germany, have invented new and useful Improvements in Alkyl Ethers of Isourea, of which the following is a specification.

Our invention concerns the production of the hitherto unknown ethers of diethyl-bromo-acetylisourea, which have proved to be valuable sedatives an average dose being from ¼ to ½ gram. The process for their production consists in treating the ethers of isourea of the formula:

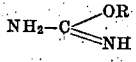

(R=a substituent e. g. alkyl or aralkyl) or their salts with diethylbromoacetyl haloids in the presence of alkaline agents. The new products having most probably the formula:

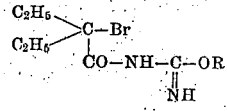

are crystalline compounds being converted by treating them with acids into the bromo-diethyl-acetylurea:

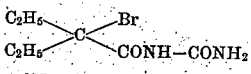

In order to illustrate the new process more fully the following example is given, the parts being by weight:—25 parts of the methylether of isourea hydrochlorid:

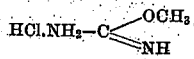

(*Berichte der Deutschen Chemischen Gesellschaft* vol. 33, 1900, p. 810) are dissolved in 200 parts of water and 50 parts of diethylbromoacetylbromid dissolved in 200 parts of benzene are added. While cooling and stirring caustic soda lye is poured to this solution until the mixture reacts alkaline. The methylether of diethylbromoacetylisourea:

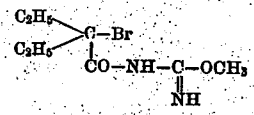

separates in a crystalline shape. It is after drying recrystallized from ligroin. This ether forms colorless crystals melting at 72° C. It is rather slightly soluble in cold water but easily soluble in alcohol, ether, acetone and acids. By heating the ether with an acid e. g. HCl or its salts e. g. the hydrochlorid it is converted into the bromo-diethylacetylurea. For this purpose 50 parts of the ether are heated with 150 parts of a strong hydrochloric acid on the water bath chloromethyl being disengaged. The bromodiethylacetylurea thus obtained is crystallized from alcohol. Instead of the methylether other derivatives e. g. isourea-ethylether or isoureabenzylether can also be used.

We claim:—

1. The herein described ethers of diethyl-bromoacetylisourea having most probably the formula:

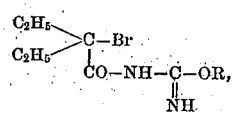

in which R means a hydrocarbon radical being crystalline powders; being converted into bromodiethylacetylurea by treatment with a hot acid; and being valuable sedatives, substantially as described.

2. The herein described methylether of diethylbromoacetylisourea having most probably the formula:

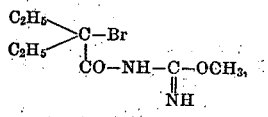

being a crystalline powder melting at 70° C. difficultly soluble in cold water, easily soluble in alcohol, ether, acetone and in acids; and being a valuable sedative, substantially as described.

In testimony whereof we have hereunto set our hands in the presence of two subscribing witnesses.

MAX ENGELMANN. [L. S.]
BENEDICT MERKEL. [L. S.]

Witnesses:
CHAS. J. WRIGHT,
ALBERT F. NUFER.